(12) United States Patent
Kocsis et al.

(10) Patent No.: US 8,990,887 B2
(45) Date of Patent: Mar. 24, 2015

(54) SECURE MECHANISMS TO ENABLE MOBILE DEVICE COMMUNICATION WITH A SECURITY PANEL

(71) Applicants: Bosch Security Systems Inc., Fairport, NY (US); Robert Bosch GmbH, Stuttgart (DE)

(72) Inventors: Gabor Tamas Kocsis, Fairport, NY (US); Christopher Alan Abbe, Rochester, NY (US); Brent Andrew Keller, Rochester, NY (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/731,737

(22) Filed: Dec. 31, 2012

(65) Prior Publication Data

US 2013/0173913 A1 Jul. 4, 2013

Related U.S. Application Data

(60) Provisional application No. 61/581,606, filed on Dec. 29, 2011.

(51) Int. Cl.
*H04L 9/32* (2006.01)
*H04W 12/06* (2009.01)
(Continued)

(52) U.S. Cl.
CPC .............. *H04L 9/321* (2013.01); *H04W 12/06* (2013.01); *H04L 63/0442* (2013.01); *H04L 63/062* (2013.01); *H04L 63/083* (2013.01); *H04L 63/108* (2013.01); *G08B 25/14* (2013.01)
USPC ............................ 726/2; 726/3; 726/4; 726/5

(58) Field of Classification Search
USPC ............ 726/1–7, 9–10, 16–21; 713/155, 156, 713/168–170, 173, 182–186
See application file for complete search history.

(56) References Cited

U.S. PATENT DOCUMENTS 6,658,091 B1   12/2003  Naidoo et al.
7,558,564 B2 *  7/2009  Wesby .......................... 455/419
(Continued)

FOREIGN PATENT DOCUMENTS

WO        03040995 A2    5/2003

OTHER PUBLICATIONS

International Search Report for Application No. PCT/US2012/072198 dated Apr. 3, 2013 (4 pages).
(Continued)

*Primary Examiner* — Hosuk Song
(74) *Attorney, Agent, or Firm* — Michael Best & Friedrich LLP

(57) ABSTRACT

A method of arming or disarming a building security system includes transferring an electronic security credential file from an authorizing environment to a mobile computing device. The electronic security credential file is read by the mobile computing device to extract authentication data. The authentication data is transmitted from the mobile computing device and received at the building security system. Within the building security system, the authentication data is used to verify that a user of the mobile computing device is authorized to communicate with the building security system. The mobile computing device is enabled to communicate with the building security system only if the electronic security credential file has been used to verify that a user of the mobile computing device is authorized to communicate with the building security system.

22 Claims, 3 Drawing Sheets

(51) Int. Cl.
*H04L 29/06* (2006.01)
*G08B 25/14* (2006.01)

(56) References Cited

U.S. PATENT DOCUMENTS

| | | | | |
|---|---|---|---|---|
| 7,852,196 B1 * | 12/2010 | Adams | ......................... | 340/5.86 |
| 8,010,997 B2 * | 8/2011 | Limont et al. | ..................... | 726/3 |
| 8,091,121 B2 * | 1/2012 | Lioy | ................................. | 726/5 |
| 8,457,622 B2 * | 6/2013 | Wesby | ......................... | 455/419 |
| 2006/0022816 A1 | 2/2006 | Yukawa | | |

OTHER PUBLICATIONS

International Preliminary Report on Patentability and Written Opinion for Application No. PCT/US2012/072198 dated Jul. 10, 2014 (9 pages).

\* cited by examiner

SECURE MECHANISMS TO ENABLE MOBILE DEVICE COMMUNICATION WITH A SECURITY PANEL

BACKGROUND OF THE INVENTION

1. Field of the Invention

The present invention relates to confidential security alarm control panel information, and, more particularly, to the transportation of confidential security alarm control panel information.

2. Description of the Related Art

Today, it is generally not possible for an end user to remotely provide inputs to a control panel of a home security system, alarm system, or surveillance system without accessing an intermediate server. Direct remote access is limited to authorized representatives of the security alarm installation company. Because encryption secrets and authentication passcodes need to be kept secret by the system in order to avoid third parties discovering the encryption secrets and passcodes and thereby being able to use them to arm, disarm, and control the system, the information cannot be securely communicated to a mobile computing device. End users of the system must utilize an intermediate computer for all remote access, imposing undesirable business and logistics restrictions.

SUMMARY OF THE INVENTION

The invention may provide an electronic means of transporting confidential security alarm control panel information via a credential file between a configuration data repository and a remote client application running on a mobile computing device, such as an iPhone®, for example. The invention may enable the client application to connect directly to the security alarm panel without the means of an application specific intermediate service or device. The invention may enable a mobile computing device to arm and/or disarm the security system from a remote location in a secure manner.

The transported information is sensitive yet required by the remote client application, and cannot be made visible to the user of the client application in order to prevent third parties from seeing the transported information. Thus, the invention protects the user's personal safety and reduces risk to property. The invention may enable secure transportation of information from a data repository with minimal user interaction to a remote device that otherwise does not have access to the data repository. The ability to connect directly from the remote application to the control panel enables the system of the invention to operate on private networks or isolated corporate networks.

The invention comprises, in one form thereof, a method of arming, disarming, or controlling a building security system, including transferring an electronic security credential file from an authorizing environment to a mobile computing device. The client application on the mobile computing device extracts encryption and authorization secrets from the electronic security credential file and uses those secrets to communicate with the building security system. Within the building security system, the credential information is received in encrypted form from to the mobile computing device. The mobile computing device then decrypts and verifies that a user of the mobile computing device is authorized to communicate with the building security system, and perform arm, disarm, and control operations therein. The mobile computing device is enabled to communicate with the building security system only if the contents from the electronic security credential file have been used to verify that a user of the mobile computing device is authorized to communicate with the building security system.

The invention comprises, in another form thereof, a security arrangement including an authorizing apparatus which generates an electronic security credential file including encryption secrets and user authentication parameters, and which transfers the electronic security credential file to a mobile computing device belonging to a user of the building security system. A building security system includes a telecommunication device and a security control unit. The security control unit has a processor and a memory device which stores the encryption secrets and authentication parameters. The security control unit receives a wireless communication from the mobile computing device via the telecommunication device encrypted using the encryptions secrets and containing authentication parameters. The security control unit decrypts the communication using the secrets stored in the memory device and verifies that authentication parameters extracted from the electronic security credential file by the mobile computing device match the authentication parameters stored in the memory device. In addition, the security control unit enables the mobile computing device to communicate with the building security system only if the encryption secrets and authorization parameters within the electronic security credential file received from the mobile computing device match the user authentication parameters stored in the memory device.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
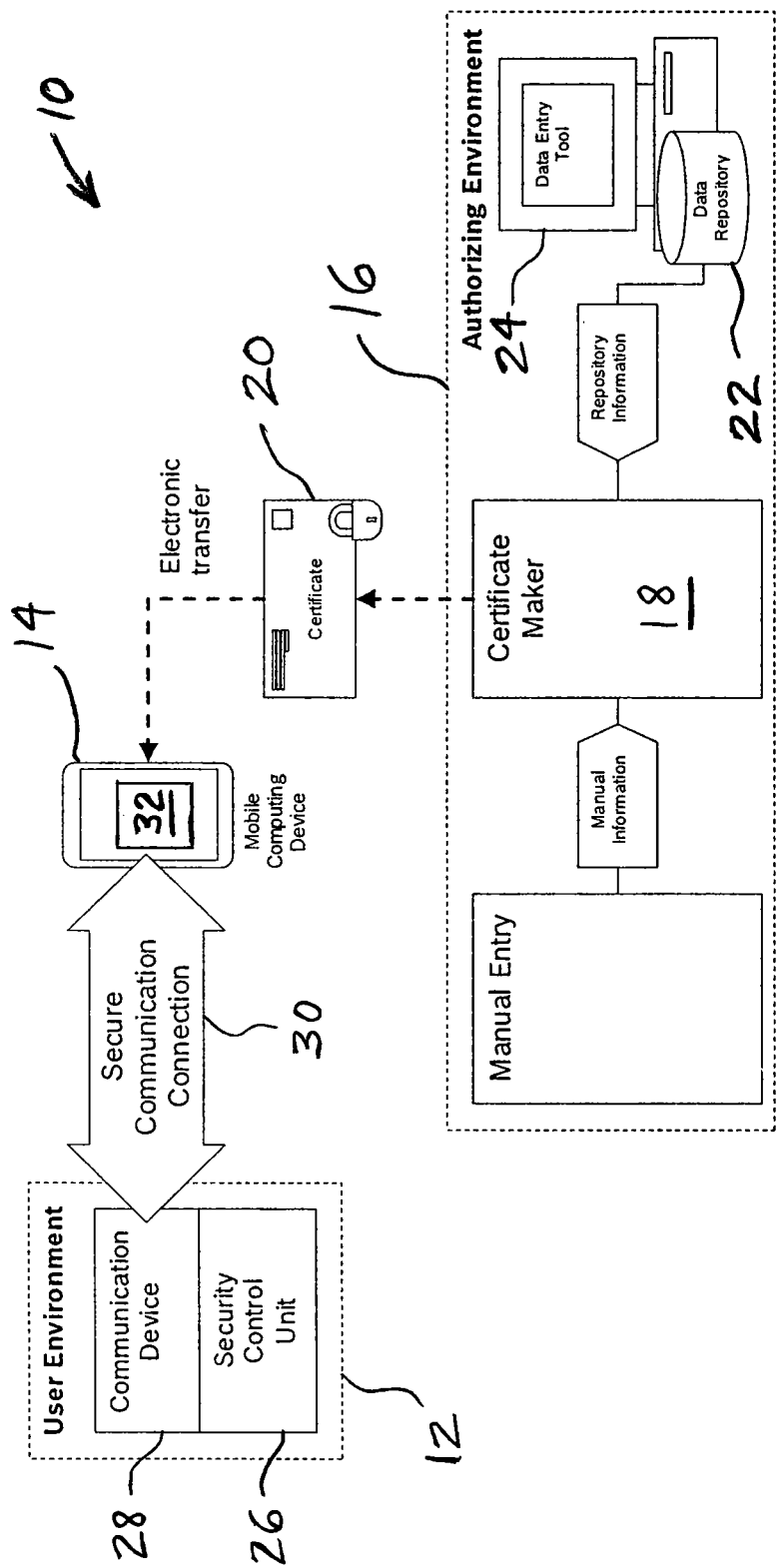
FIG. 1 is a block diagram of one embodiment of a security arrangement of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Security arrangement 10 (FIG. 1) includes a user environment 12, a mobile computing device (e.g., a Smartphone, such as an iPhone®) 14, and an authorizing environment 16. A certificate maker 18 within authorizing environment 16 provides a certificate 20 to device 14 via electronic transfer or via some physical transfer. Certificate 20 may enable device 14 to engage in secure communication with user environment 12.

User environment may be in the form of a building security system including a security control unit 26, which may include a processor and memory for storing user authorization parameters, and a communication device 28. Communication device 28 may enable user environment to electronically communicate with mobile computing device 14 via a secure communication connection 30.

After mobile computing device 14 has received security certificate 20, device 14 may check that the certificate was issued by a trusted party (e.g., authorizing environment 16), that the certificate is still valid and that the certificate is related to that particular user environment 12 that is to be contacted.

After mobile computing device 14 has extracted the contents of, and verified the validity of security certificate 20, device 14 may initiate communication with user environment 12 via the internet or via cellular telecommunication. User environment 12 may then request that device 14 send user environment 12 the information stored in security certificate 20 so that a secure connection may be established therebetween. In response, mobile computing device 14 may transmit the information extracted from the security certificate 20 to user environment 12.

Next, user environment 12 may ensure that the certificate was issued by a trusted party by verifying that certificate 20 includes a passcode that has previously been loaded into and/or saved within user environment 12 for the purpose of validating the certificate. Upon a valid security certificate being received by user environment 12, user environment 12 and mobile computing device 14 may engage in communications therebetween in either direction.

Authorizing environment 16 may be disposed at and/or controlled by a central office that monitors the security control unit of user environment 12. For example, the central office may be in communication with the security control unit and may be alerted by the security control unit with an alarm signal when the security control unit detects a security breach, such as a human intruder, for example. In response to being informed of the security breach, the central office may dispatch police or other appropriate personnel to the location of the security control unit. In another embodiment, authorizing environment 16 is not a central office, but rather is an installer, dealer, or retailer of the security system within user environment 12.

The certificate maker 18 within authorizing environment 16 may provide certificate 20 to mobile computing device 14 via various types of electronic transfer, including, but not limited to, electronic mail, cellular telecommunication, and internet downloading from a web site, for example. Downloading from a web site may be performed in conjunction with a media library application such as iTunes®, for example. It is also possible, in another embodiment, for certificate 20 to be delivered to the user and owner of mobile device 14 on a memory device, such as a USB flash drive or USB memory stick, along with the security system hardware that is delivered at installation. The user may then upload certificate 20 from the memory device to mobile computing device 14. Thus, by physically transferring certificate 20 from authorizing environment 16 to the user of mobile computing device 14, the possibility that certificate 20 may be intercepted by a third party during electronic transfer of certificate 20 to mobile computing device 14 may be eliminated. However, certificate 20 may be encrypted before leaving authorizing environment 16 such that certificate 20 may be decrypted only by software in device 14. Thus, certificate 20 may be rendered useless to a third party who intercepts certificate 20. As described above, security certificate 20 may be delivered to the remote application within mobile computing device 14 by any standard means of data communication. Such standard means of data communication may include, but are not limited to, electronic mail, internet downloading, and cellular telecommunication.

Certificate 20 may be useable only with that particular installed security system, and may be unique to the passcode that the user must enter into the security system to gain access thereto. That is, certificate 20 may include the user's current passcode at the time that certificate 20 is generated. The passcode within certificate 20 may be required to match the then current user passcode at the time at which mobile computing device 14 communicates to user environment 12 in order for user environment 12 to engage in communication with mobile computing device 14. Thus, it may be required for a new certificate 20 to be generated in response to the user's passcode being changed.

The security credential file in the form of certificate 20 may be generated by connecting to, and extracting the required information from a data repository 22. Alternatively, the required information may be entered manually. Certificate 20 may be in the form of a "personal certificate" as opposed to a web site certificate. Thus, certificate 20 may serve as a verification that mobile device 14 is owned and/or operated by a person who is also authorized to access the security control unit.

The invention may enable direct connection between a security alarm control panel within user environment 12 and a remote application running on device 14. A security credential file, e.g., certificate 20, may be used to securely transmit sensitive information necessary to connect to a security alarm control panel within user environment 12. The security credential file may also contain configuration data or remote programming software, otherwise known as "configuring software." The credential file may be generated by authorized personnel. Contents of the file may be automatically retrieved from a data repository 22 or entered manually.

The security certificate may provide a variety of user functionality features. Specifically, the security certificate may enable the connection mechanisms to be made directly to the control panel from the application. The security certificate may also hide connection details from the users of the remote application, thereby preventing third party onlookers from seeing the private connection details. Further, the security certificate may improve the user's experience by limiting the amount of manual data entry that it is necessary for the user to perform. Another functionality feature provided by the security certificate is that it may prevent access to the security alarm control panel via the remote application by unauthorized personnel.

In one embodiment, the security certificate may enable control of the availability of functions of the remote application for each individual user. That is, each certificate 20 may be unique to each individual user of a group of people who share a same passcode. For example, the home owner may have a first certificate which authorizes the home owner to have full control of the functions of the security system, such as arming and disarming the system or arming and disarming individual sensors within the system, and viewing the images captured by security cameras on mobile device 14. On the other hand, a child living at the home may have a second certificate which only authorizes the child to arm the system, which may be useful in the event that the child forgets to arm locally before leaving the home. In this case, identifying information associated with the user's mobile device 14 may be included within each certificate 20 such that user environment 12 may accept a connection 30 only from a matching mobile device 14. In another embodiment, each individual user may also have his own individual passcode, in which case each certificate 20 may be usable only by a particular user, with his particular passcode, and on a particular security system.

The usage of the security credential file may be restricted to a specific date range that may be included within the security credential file. The specific date range may be defined by authorized personnel at authorizing environment 12. Alternatively, the specific date range may be defined automatically by certificate maker 18.

The remote application running on mobile computing device 14 may validate and establish a connection with user environment 12 if the current date is within the specified date range of certificate 20. That is, a connection may be established between mobile computing device 14 and user environment 12 only if the current date is within the specified date range of certificate 20, i.e., if the date information can be verified. The current date may be obtained from a reference source location, such as a memory device associated with an internal clock of mobile device 14; a memory device associated with an externally available mean time clock (e.g., an internet time server), for example. If the current date obtained from the reference source is within the date range of the security certificate, then the user may be allowed to connect to the security control panel. The number of connections to a security alarm control panel using a valid security certificate may not be limited within the date range of the security certificate.

Figure 2:
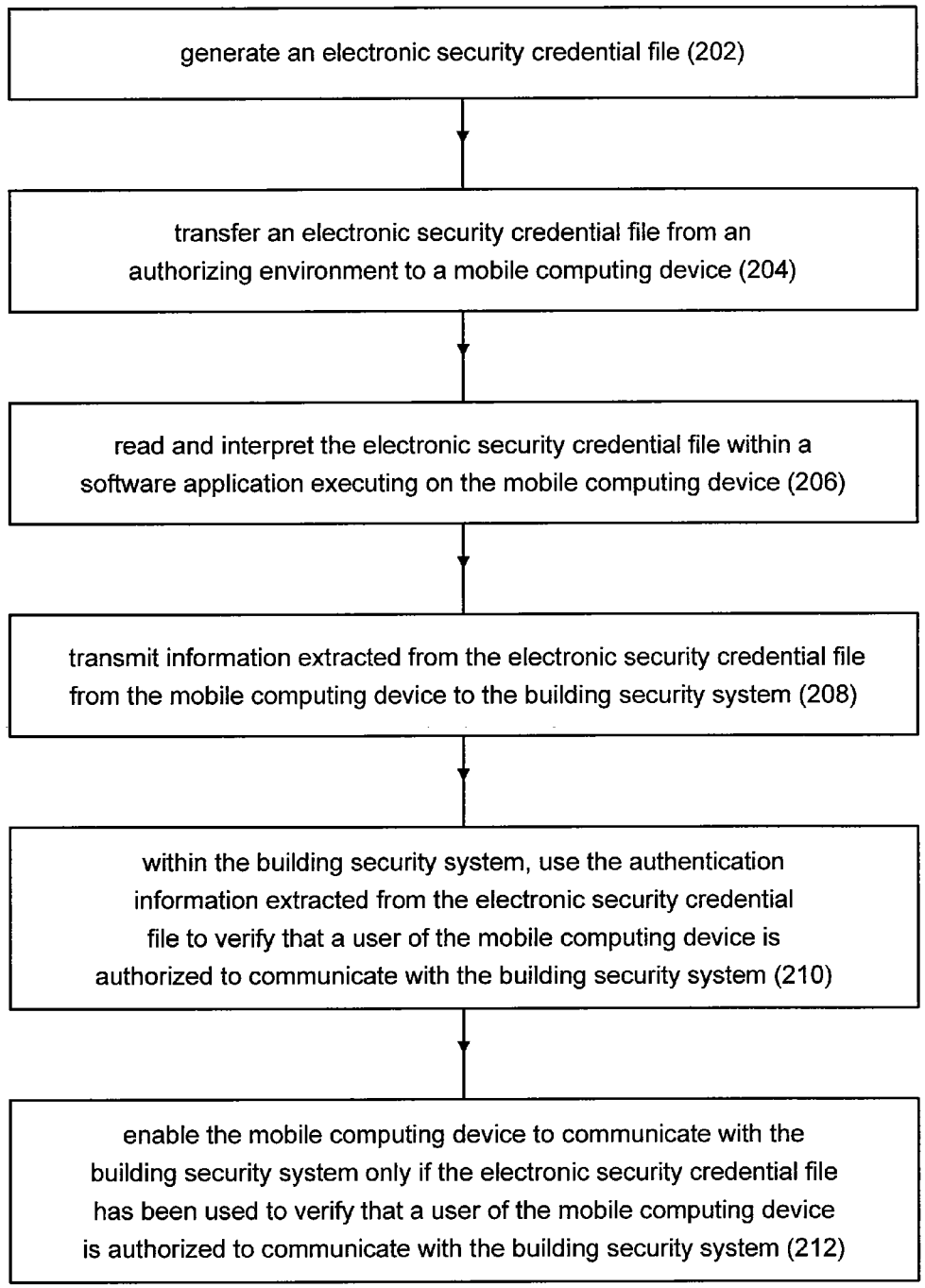
FIG. 2 is a flow chart of one embodiment of a method of the present invention for operating the security arrangement of FIG. 1.

FIG. 2 is a flow chart illustrating one embodiment of a method 200 of the present invention for operating a security arrangement, such as security arrangement of FIG. 1. In a first step 202, an electronic security credential file is generated within an authorizing environment. The electronic security credential file may be generated either manually or automatically within the authorizing environment. For example, human personnel may manually enter information into certificate 20. Alternatively, certificate 20 may be generated automatically by connecting to data repository 22 and retrieving repository information therefrom. A data entry tool 24 may be used to enter data into data repository 22.

The electronic security credential file may be in the form of an electronic authorization certificate 20, which may include various types of authentication parameters, configuration data and/or remote programming software. The usage of the electronic security credential file is restricted to a specific date range, such as a particular month or a particular year, for example. Thus, the electronic security credential file may include information identifying the specific valid date range. The electronic security credential file may also include a passcode that the user enters into a control panel of security control unit 26 in order to arm and/or disarm the security system.

Authorizing environment 16 may be in the form of a central office that monitors the building security system and dispatches police or firemen in the event that a security breach is detected by the building security system. However, authorizing environment 16 may alternatively be in the form of a retailer or installer of security control unit 26 such that personnel authorizing environment 16 may install codes, information and/or software within security control unit 26 that enables security control unit 26 to recognize and accept a particular certificate 20.

In a next step 204, an electronic security credential file is transferred from an authorizing environment to a mobile computing device. That is, certificate maker 18 of authorizing environment 16 may electronically and/or physically transfer security certificate 20 to mobile computing device 14 such as by email, telecommunication, enabling device 14 to download certificate 20 from the internet, and/or providing a user of device 14 with a memory device having certificate 20 stored thereon such that the user can copy certificate 20 onto device 14. Certificate 20 may be in encrypted form while in transit to device 14 to prevent certificate 20 from being used if it falls into the wrong hands en route.

In step 206, the security credential file is read and interpreted within a software application executing on the mobile computing device. That is, certificate 20 may be read and interpreted within a software application 32 running on mobile device 14.

Next, in step 208, information extracted from the electronic security credential file is transmitted from the mobile computing device to the building security system. For example, mobile computing device 14 may initiate contact with user environment 12 via wireless telecommunication and through communication device 28. Included within this telecommunication, device 14 may include the same certificate 20 that certificate maker 18 had previously transferred to device 14. This transmission of information from device 14 to user environment 12 may or may not be at the request of user environment 12. This transmission of certificate from device 14 to user environment 12 may also be encrypted to prevent certificate 20 from being used if it falls into the wrong hands en route.

In step 210, within the building security system, authentication information extracted from the electronic security credential file is used to verify that a user of the mobile computing device is authorized to communicate with the building security system. For example, after certificate request for secure communication connection 30, security control unit 26 may verify that the received authentication passcode is the authentication passcode, or one of the authentication passcodes, that security control unit 26 was programmed to recognize and accept upon manufacture or installation, or was remotely programmed to recognize and accept by authorizing environment 16. Among the features of certificate 20 that security control unit 26 may attempt to verify as being authentic, are that certificate 20 includes or identifies the current valid passcode for the user of mobile computing device 14, and identifies the particular security system for which the passcode is valid; that certificate 20 includes or identifies a currently valid passcode for security control unit 26, and identifies the particular security system for which the passcode is valid; that the current date is within the range in which certificate 20 is valid; and/or other necessary information such as configuration data or remote programming software, otherwise known as "configuring software," for example.

In one embodiment, the electronic security credential file includes an identity of the mobile computing device 14 to which the electronic security credential file 20 was transmitted. Within the software application on device 14, the identity of the valid authorized mobile computing device 14 stored in certificate 20 is verified to match the identity of the specific instance of a mobile computing device 14 on which the application is executing. The mobile computing device may be enabled to communicate with user environment 12 only if the identity of the respective mobile computing device from which the electronic security credential file is being access matches the identity stored within the electronic security credential file 20.

In a final step 212, the mobile computing device is enabled to communicate with the building security system only if the electronic security credential file has been used to verify that a user of the mobile computing device is authorized to communicate with the building security system. That is, security control unit 26 may allow mobile computing device 14 to communicate with security control unit 26 only if in step 208 security control unit 26 was able to verify that the received certificate 20 is the certificate, or one of the certificates, that includes authorization information that security control unit 26 was programmed to recognize and accept upon manufacture or installation, or was remotely programmed to recognize and accept by authorizing environment 16.

Figure 3:
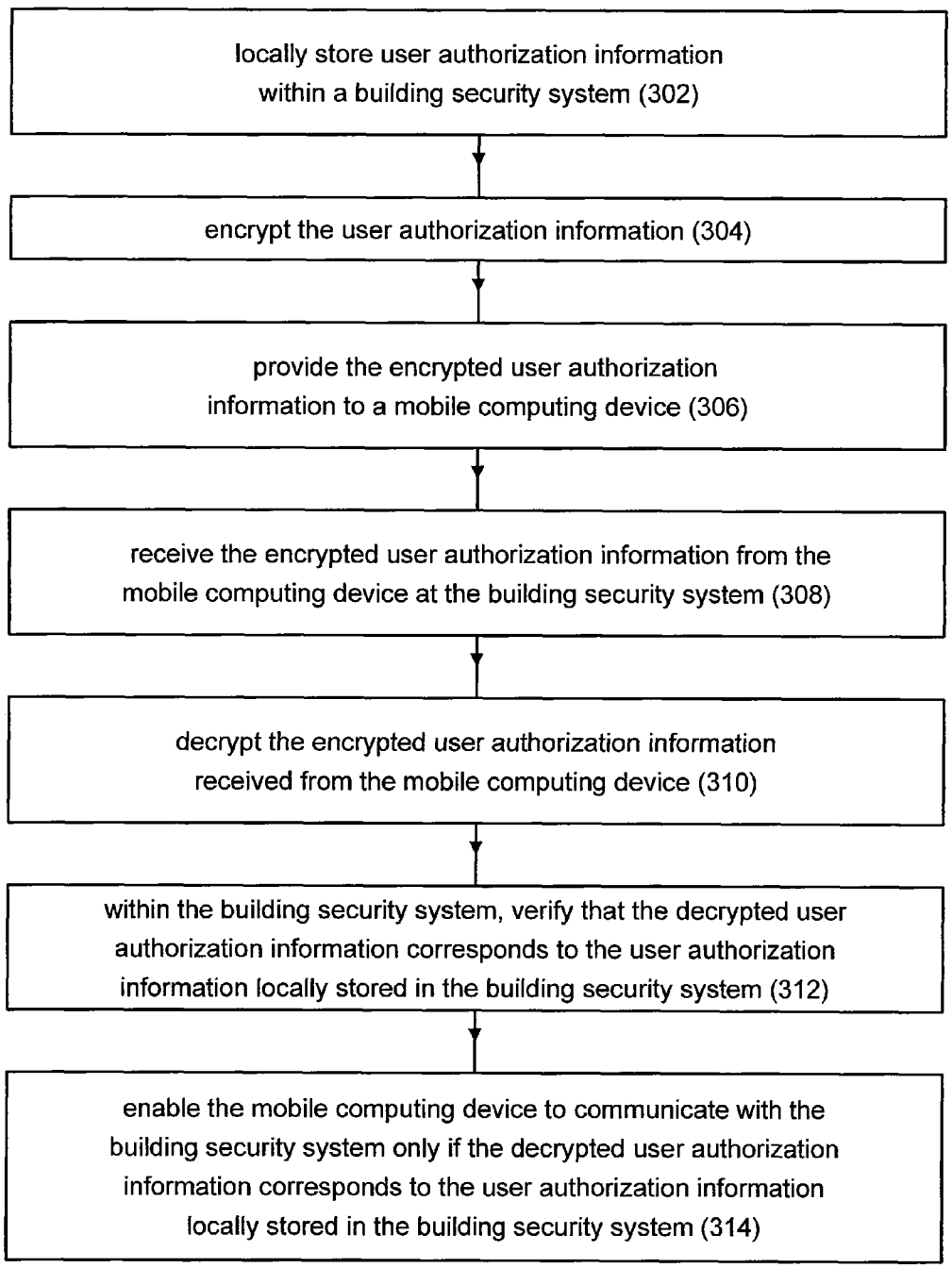
FIG. 3 is a flow chart of one embodiment of a method of the present invention for operating a building security system.

FIG. 3 is a flow chart illustrating another embodiment of a method 300 of the present invention for operating a building security system. In a first step 302, user authorization information is locally stored within the building security system. For example, user authorization information including may include various types of authentication parameters, configuration data and/or remote programming software. The authentication parameters may include a date range in which the authorization information is valid, a passcode that the user enters into a control panel of security control unit 26 in order to arm and/or disarm the security system, and/or an identity of a mobile communication device belonging to the user.

Next, in step 304, the user authorization information is encrypted. For example, the user authorization information may be encrypted within authorizing environment 16 by any standard encryption algorithm.

In a next step 306, the encrypted user authorization information is provided to a mobile computing device. For example, authorizing environment 16 may electronically transfer the encrypted user authorization information to mobile computing device 14.

In step 308 the encrypted user authorization information is received from the mobile computing device at the building security system. In one embodiment, mobile computing device 14 places a wireless cellular phone call to communication device 22 and subsequently transmits the encrypted user authorization information to communication device 22.

Next, in step 310, the encrypted user authorization information received from the mobile computing device is decrypted. For example, security control unit 26 may decrypt the received user authorization information according to a pre-arranged and confidential algorithm.

In a next step 312, within the building security system it is verified that the decrypted user authorization information corresponds to the user authorization information locally stored in the building security system. That is, security control unit 26 may compare the results of the decryption to the valid user authorization information stored in local memory. If there is a match therebetween, or at least some type of correspondence therebetween, then the verification is made.

In a final step 314, the mobile computing device is enabled to communicate with the building security system only if the decrypted user authorization information corresponds to the user authorization information locally stored in the building security system. That is, if the verification is made in step 312 then the user of mobile communication device 14 may be allowed to remotely control the building security system within the limits of his personal authorization.

What is claimed is:

1. A method of operating a building security system, comprising the steps of:
   electronically transferring an electronic security credential from an authorizing environment to a mobile computing device;
   reading and interpreting the security credential file within a software application executing on the mobile computing device;
   receiving from the mobile computing device at a building security system a communication including authentication data transmitted in the electronic security credential file;
   within the building security system, using the authentication data to verify that a user of the mobile computing device is authorized to communicate with the building security system; and
   enabling the mobile computing device to communicate with the building security system only if the authentication data stored in the electronic security credential file has been used to verify that a user of the mobile computing device is authorized to communicate with the building security system.

2. The method of claim 1, wherein the mobile computing device provides the authentication data to the building security system and the building security system uses the authentication data to verify that a user of the mobile computing device is authorized to communicate with the building security system without accessing an intermediate server.

3. The method of claim 2, wherein the electronic transfer is in the form of an electronic mail message.

4. The method of claim 1, wherein the electronic security credential file comprises an electronic authorization certificate, and wherein the step of enabling the mobile computing device to communicate with the building security system, further comprises the building security system accepting a connection with the mobile computing device.

5. The method of claim 1, wherein usage of the electronic security credential file is restricted to a specific date range.

6. The method of claim 1, comprising the further step of generating the electronic security credential file by connecting to a data repository within the authorizing environment and extracting information from the data repository.

7. The method of claim 1, comprising the further step of generating the electronic security credential file by manual entry of information within the authorizing environment.

8. The method of claim 1, wherein the electronic security credential file is unique to the building security system.

9. The method of claim 1, wherein the authorizing environment comprises a central office, wherein the central office monitors whether the building security system detects a security breach.

10. The method of claim 1, wherein the authorizing environment comprises a central office, wherein the central office coordinates installation and maintenance of security alarm components.

11. The method of claim 1, comprising the further step of enabling the mobile computing device to remotely enable or remotely disable the building security system.

12. The method of claim 1, wherein the electronic security credential file contains the internet address of the building security system.

13. The method of claim 1, wherein communication between the building security system and external devices is encrypted using a symmetric encryption key, and the electronic security credential file contains the symmetric encryption key.

14. The method of claim 1, wherein the electronic security credential file includes a first passcode, the enabling step including enabling the mobile computing device to communicate with the building security system only if the first passcode within the electronic security credential file corresponds to a second passcode that is stored in the building security system.

15. A method of operating a building security system, comprising the steps of:

transferring an electronic security credential file from an authorizing environment to a mobile computing device;

reading and interpreting the security credential file within a software application executing on the mobile computing device;

receiving from the mobile computing device at a building security system a communication including authentication data transmitted in the electronic security credential file;

within the building security system, using the authentication data to verify that a user of the mobile computing device is authorized to communicate with the building security system; and enabling the mobile computing device to communicate with the building security system if the authentication data including a first passcode that is stored in the electronic security credential file matches a second passcode that is stored in the building security system and the user of the remote computing application software enters a third passcode at the time of the connection that matches a fourth passcode that is stored in the building security system to verify that the user of the mobile computing device is authorized to communicate with the building security system.

16. The method of claim 15, wherein the first and second passcodes are secret to representatives of the authorizing environment.

17. The method of claim 1, wherein the electronic security credential file includes a first passcode, the enabling step including enabling the mobile computing device to communicate with the building security system only if the first passcode within the electronic security credential file corresponds to a second passcode that is stored in the building security system and that is valid for only one particular user.

18. The method of claim 17, wherein the electronic security credential file includes an identity of the mobile computing device for which the electronic security credential file was generated, the enabling step including enabling the mobile computing device to communicate with the building security system only if the identity of the mobile computing device from which the electronic security credential file was received matches the identity included in the security credential file.

19. A security arrangement, comprising:
an authorizing apparatus configured to:
generate an electronic security credential file including user authentication parameters; and
transfer the electronic security credential file to a mobile computing device belonging to a user of the building security system; and a software application executing on the mobile computing device configured to extract the user authentication parameters from the electronic security credential file; and a building security system including a telecommunication device and a security control unit, the security control unit having a processor and a memory device configured to store the user authentication parameters, the security control unit being configured to:
receive a wireless communication from the mobile computing device via the telecommunication device, the wireless communication including the user authentication parameters stored in the electronic security credential file that the mobile computing device received from the authorizing apparatus;
verify that user authentication parameters within the electronic security credential file received from the mobile computing device match the user authentication parameters stored in the memory device; and
enable the mobile computing device to communicate with the building security system only if the security control unit of the building security system has verified that the user authentication parameters within the electronic security credential file received from the mobile computing device match the user authentication parameters stored in the memory device.

20. The arrangement of claim 19, wherein the authorizing apparatus is configured to encrypt the electronic security credential file transferred to the mobile computing device, and a software application executing on the mobile computing device is configured to decrypt the electronic security credential file received from the authorizing apparatus.

21. The arrangement of claim 20, wherein the encryption step is performed by a public key, and the decryption step is performed using a private key that corresponds to the public key known to the authorizing apparatus.

22. The arrangement of claim 19, wherein the authentication parameters include an identification of the building security system and a passcode corresponding to at least one of the building security system and a user of the mobile computing device.

* * * * *